(12) United States Patent
Coffland et al.

(10) Patent No.: US 9,441,663 B2
(45) Date of Patent: Sep. 13, 2016

(54) METHOD OF USING A RETENTION CLIP TO CLOSE HARDWARE

(71) Applicant: THE BOEING COMPANY, Chicago, IL (US)

(72) Inventors: Donald W. Coffland, Seattle, WA (US); Mark D. Klein, Seattle, WA (US); Shane C. Kleppen, Issaquah, WA (US); Kenneth Wayne Lilly, Renton, WA (US); Edward L. White, Covington, WA (US); Douglas S. Jones, Orting, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/562,846

(22) Filed: Dec. 8, 2014

(65) Prior Publication Data

US 2015/0089786 A1 Apr. 2, 2015

Related U.S. Application Data

(62) Division of application No. 12/325,770, filed on Dec. 1, 2008, now Pat. No. 8,905,693.

(51) Int. Cl.

| | |
|---|---|
| F16B 2/24 | (2006.01) |
| F16B 39/24 | (2006.01) |
| F16B 43/00 | (2006.01) |
| F16L 3/123 | (2006.01) |
| F16B 37/04 | (2006.01) |
| F16B 37/02 | (2006.01) |

(52) U.S. Cl.
CPC .............. *F16B 39/24* (2013.01); *F16B 2/241* (2013.01); *F16B 43/00* (2013.01); *F16L 3/1233* (2013.01); *F16L 3/1236* (2013.01); *F16B 37/02* (2013.01); *F16B 37/042* (2013.01); *Y10S 411/999* (2013.01); *Y10T 24/4453* (2015.01); *Y10T 29/49815* (2015.01); *Y10T 29/49826* (2015.01); *Y10T 29/49948* (2015.01); *Y10T 29/49963* (2015.01)

(58) Field of Classification Search
CPC ................. Y10T 29/49963; Y10T 29/49948; F16B 2/241; F16B 37/042; F16B 43/001; F16L 3/1233
See application file for complete search history.

(56) References Cited

U.S. PATENT DOCUMENTS

| | | | |
|---|---|---|---|
| 334,790 A | | 1/1886 | McTighe |
| 1,928,468 A | | 9/1933 | Tinnerman |
| 2,070,005 A | | 2/1937 | Chesley et al. |
| 2,135,417 A | | 11/1938 | Tinnerman |
| 2,230,916 A | | 2/1941 | Tinnerman |
| 2,244,823 A | | 6/1941 | Burke |
| 2,315,359 A | | 3/1943 | Tinnerman |
| 2,336,319 A | | 12/1943 | Tinnerman |
| 2,338,658 A | * | 1/1944 | Morehouse ........... F16L 3/1233 174/40 CC |

(Continued)

*Primary Examiner* — Jermie Cozart
(74) *Attorney, Agent, or Firm* — Patterson + Sheridan, LLP

(57) ABSTRACT

A method of using a retention clip to secure hardware is provided. The retention clip may include a support surface having an aperture extending through the support surface. The retention clip may further include two anti-rotation surfaces extending from the support surface in a non-parallel direction, and at least one angled tab extending from the support surface in a non-parallel direction towards the aperture of the retention clip. The at least one angled tab may be elastic below a preset load placed on the at least one angled tab, and the at least one angled tab may deform and lose its elasticity above the preset load.

20 Claims, 7 Drawing Sheets

(56) References Cited

U.S. PATENT DOCUMENTS

| | | | |
|---|---|---|---|
| 2,362,679 A * | 11/1944 | Tinnerman | F16L 3/1233 248/74.3 |
| 2,379,893 A | 7/1945 | Ray | |
| 2,397,253 A | 3/1946 | Ray | |
| 2,401,202 A | 5/1946 | Tinnerman | |
| 2,406,415 A | 8/1946 | Tinnerman | |
| 2,470,309 A * | 5/1949 | Hepp | F16L 3/1233 29/270 |
| 2,571,786 A | 10/1951 | Tinnerman | |
| 2,609,418 A | 9/1952 | Binns et al. | |
| 2,627,385 A | 2/1953 | Tinnerman | |
| 2,636,533 A | 4/1953 | Tinnerman | |
| 2,672,905 A | 3/1954 | Hartman et al. | |
| 2,695,046 A | 11/1954 | Tinnerman, III | |
| 2,916,114 A | 12/1959 | Flora | |
| 3,207,022 A | 9/1965 | Tinnerman | |
| 3,229,743 A | 1/1966 | Derby | |
| 3,308,708 A | 3/1967 | Holton | |
| 3,869,760 A | 3/1975 | Meyer | |
| 4,200,027 A | 4/1980 | Oehlke | |
| 4,607,422 A | 8/1986 | Scaramucci | |
| 5,256,018 A | 10/1993 | Rattmann et al. | |
| 6,238,156 B1 | 5/2001 | Leibman | |
| 6,457,924 B1 | 10/2002 | Wallace | |
| 7,568,868 B2 | 8/2009 | Motsch et al. | |
| 7,736,111 B2 | 6/2010 | De Azevedo et al. | |
| 2006/0251491 A1 | 11/2006 | De Azevedo et al. | |

\* cited by examiner

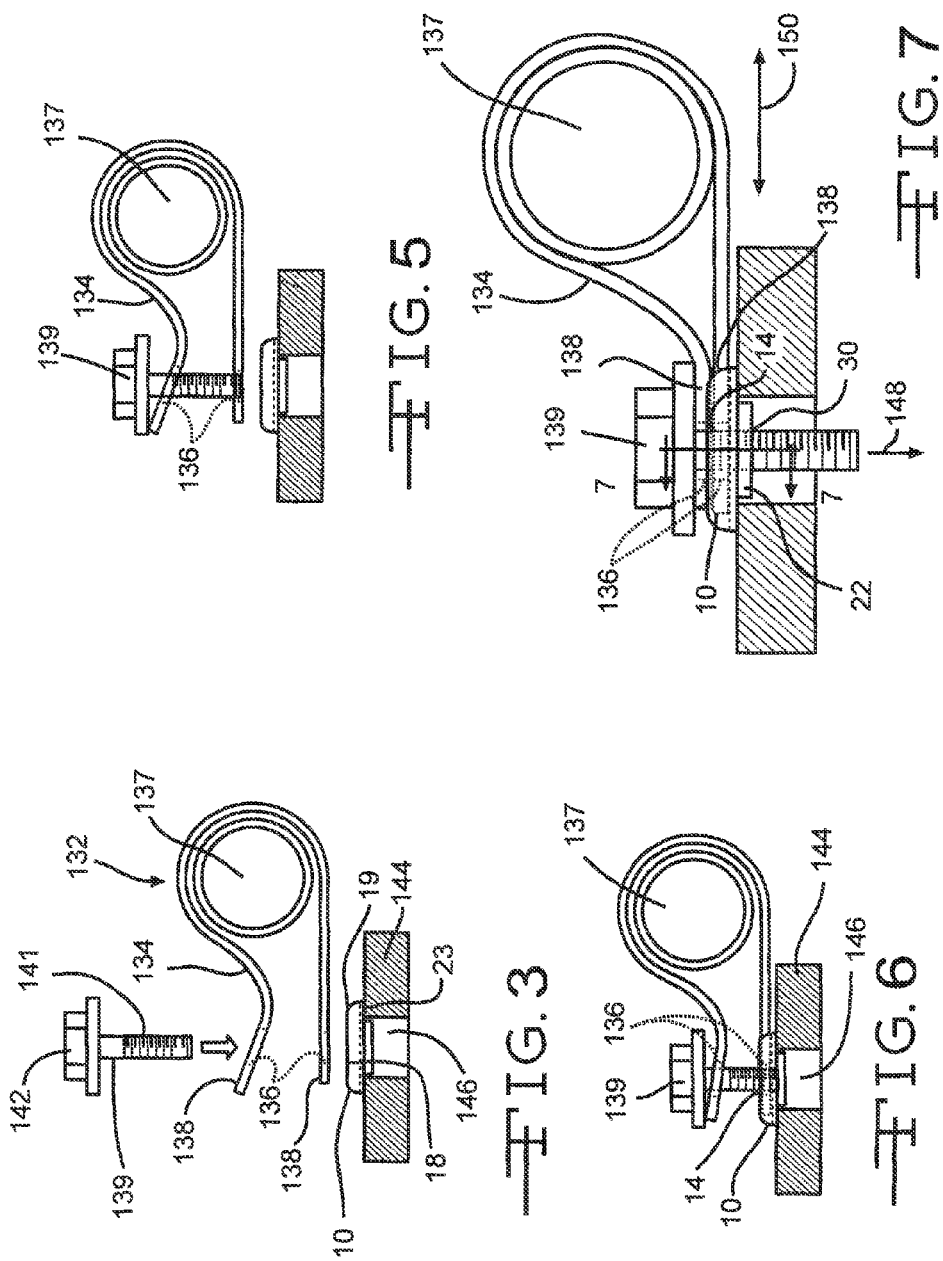

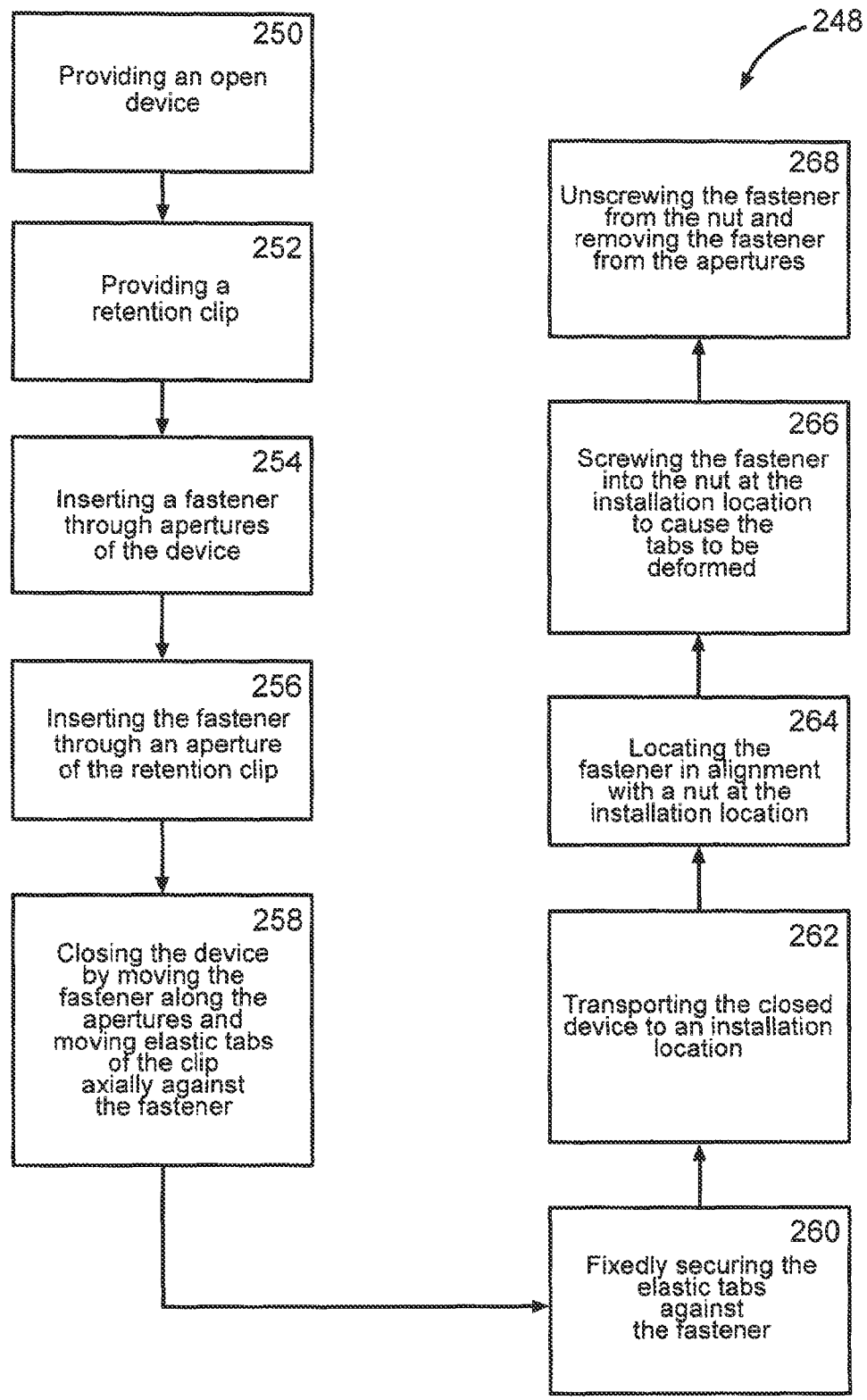

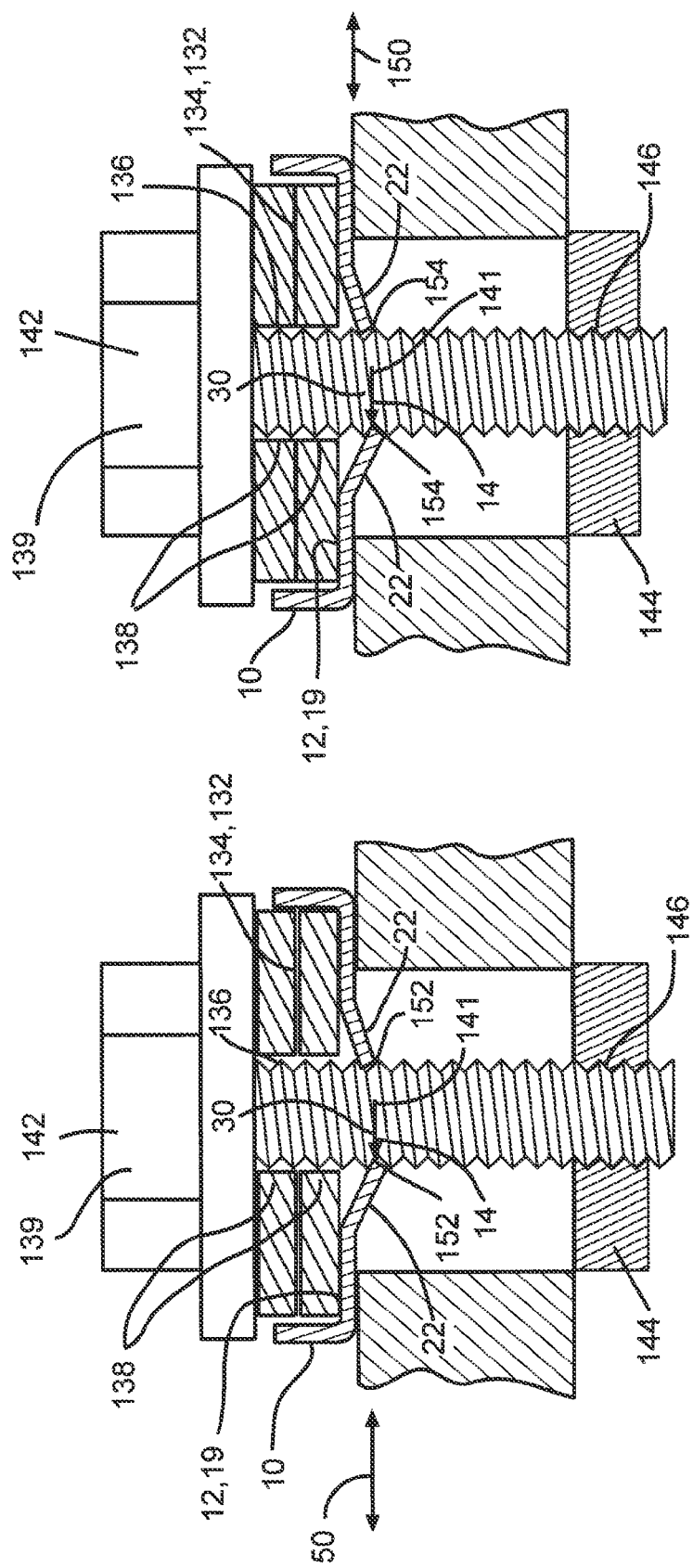

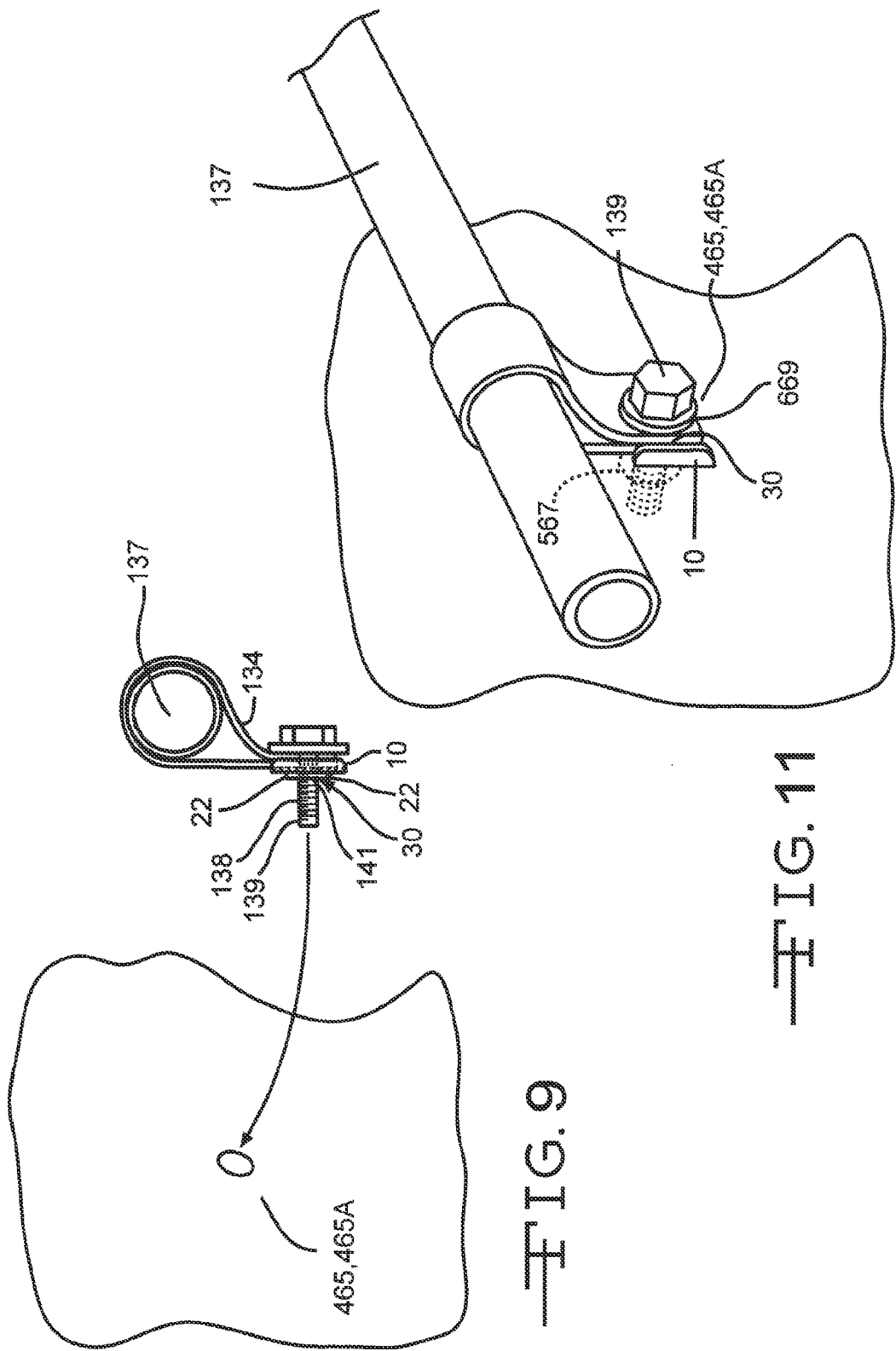

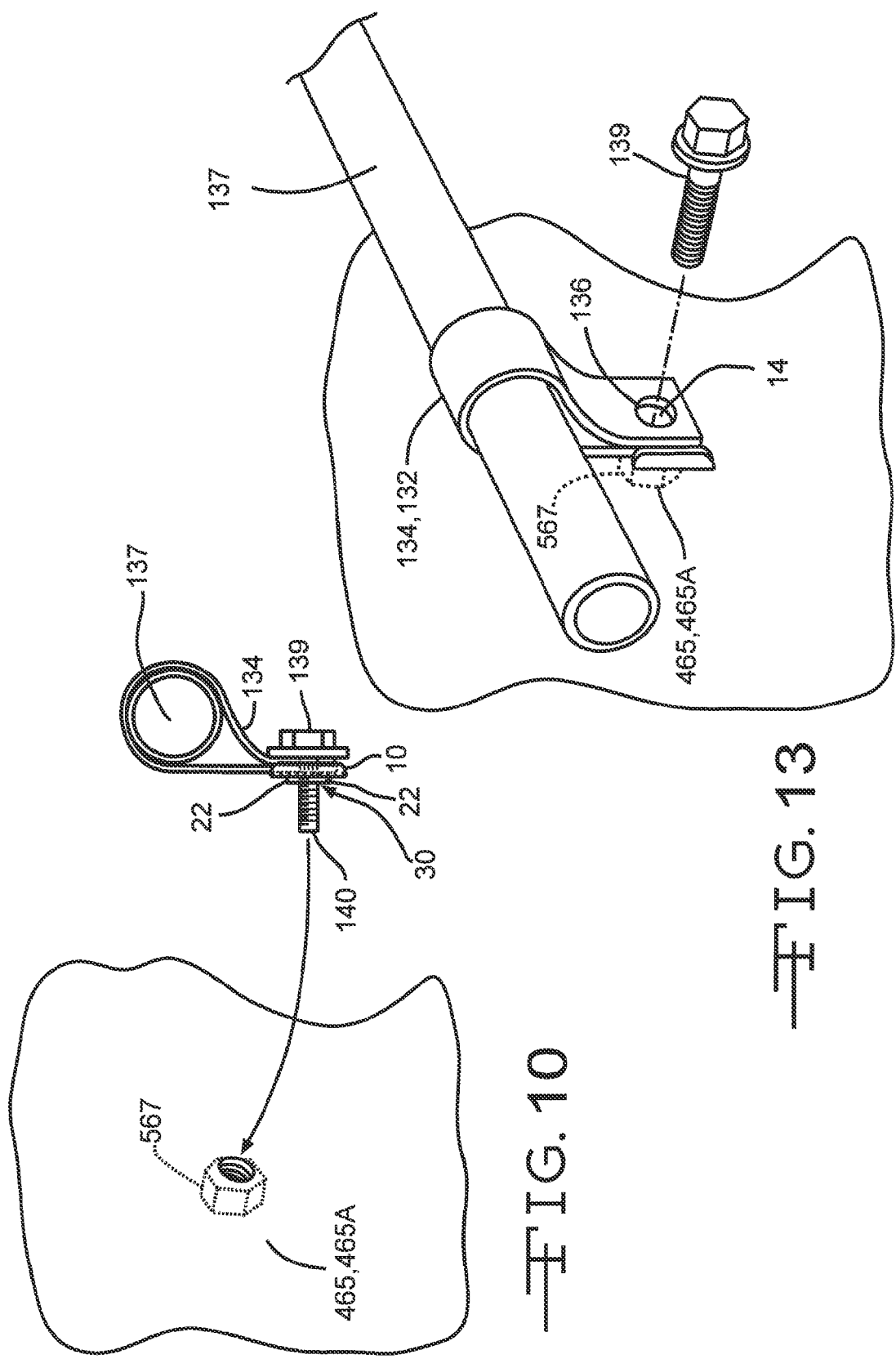

METHOD OF USING A RETENTION CLIP TO CLOSE HARDWARE

This application is a divisional application of U.S. application Ser. No. 12/325,770, filed on Dec. 1, 2008, the disclosure of which is incorporated by reference herein in its entirety.

BACKGROUND OF THE DISCLOSURE

Devices such as clamps are often used during the transport and/or installation of hardware, such as fasteners, washers, spacers, tubes, and/or other types of hardware, during the manufacture of structures such as aircrafts, vehicles, and other types of structures. During the transport and installation of the hardware, it is important that the devices remain closed and snug to retain the hardware as originally organized. For instance, in the construction of aircraft, it is important that the tubing assemblies maintain their shape during transport and installation. As a result, the devices and/or fasteners holding the assemblies must be held in place during transport and installation. One prior art apparatus for holding devices in place is the use of plastic ties to tie down the devices during transport and install. However, these plastic ties may be time consuming to install, may not hold the fasteners of the device in place, and may need to be removed prior to final tightening. Another prior art apparatus for holding devices in place are radially installed clips having open apertures. However, these clips may not self-align to the fasteners of the device, may rotate relative to the device, and after being attached to the fasteners may not be easily removed thereby interfering with the installation process, and/or interfering with the subsequent removal of the fasteners and/or equipment. Additionally, these clips may fall off or be lost, become debris, and/or cause collateral damage.

An apparatus and/or method is needed to decrease one or more problems associated with one or more of the existing apparatus and/or methods for facilitating closure, maintaining closure, and captivating hardware of a hardware device.

SUMMARY OF THE DISCLOSURE

In one aspect of the disclosure, a retention clip may include a support surface having an aperture extending through the support surface. The support surface may surround an entire perimeter of the aperture. The clip may further include at least one anti-rotation surface extending from the support surface in a non-parallel direction, and a plurality of angled tabs extending from the support surface in non-parallel directions towards the aperture. At least a portion of each angled tab may be disposed directly below the aperture. The tabs may be elastic below a preset load placed on the tabs, and the tabs may deform and lose their elasticity above the preset load.

In another aspect of the disclosure, a method of closing a device is disclosed. The retention clip may include a support surface having an aperture extending through the support surface. The retention clip may further include two anti-rotation surfaces extending from the support surface in a non-parallel direction, and at least one angled tab extending from the support surface in a non-parallel direction towards the aperture of the retention clip. The at least one angled tab may be elastic below a preset load placed on the at least one angled tab, and the at least one angled tab may deform and lose its elasticity above the preset load.

These and other features, aspects and advantages of the disclosure will become better understood with reference to the following drawings, description and claims.

BRIEF DESCRIPTION OF THE DRAWINGS

FIG. 3 shows a side view of one embodiment of hardware to which the clip of FIGS. 1 and 2 may be applied;

FIG. 4 is a flowchart of one embodiment under the disclosure of a method of closing a device using a clip;

FIG. 5 shows a side view of the fastener of FIG. 3 being inserted through the apertures of a device of FIG. 3;

FIG. 6 shows a side view of the fastener of FIG. 5 being inserted through an aperture of the clip;

FIG. 7 shows a side view of the device of FIG. 6 being closed by movement of the fastener;

FIG. 7A shows a cross-section view through line 7-7 of the clip of FIG. 7 with tabs of the clip in one elastic position over threads of the fastener;

FIG. 7B shows a cross-section view of the tabs of the clip of FIG. 7A elastically snapping over the threads of the fastener into another position;

FIG. 9 shows a side view of the closed, secured device of FIG. 7 being transported to an installation location;

FIG. 10 shows a side view of an end of the fastener of FIG. 9 being located in alignment with a nut at the installation location;

FIG. 11 shows a perspective view of the fastener of FIG. 10 being screwed into the nut at the installation location;

FIG. 13 shows a perspective view of the fastener of FIG. 11 being unscrewed from the nut at the installation location.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 2:
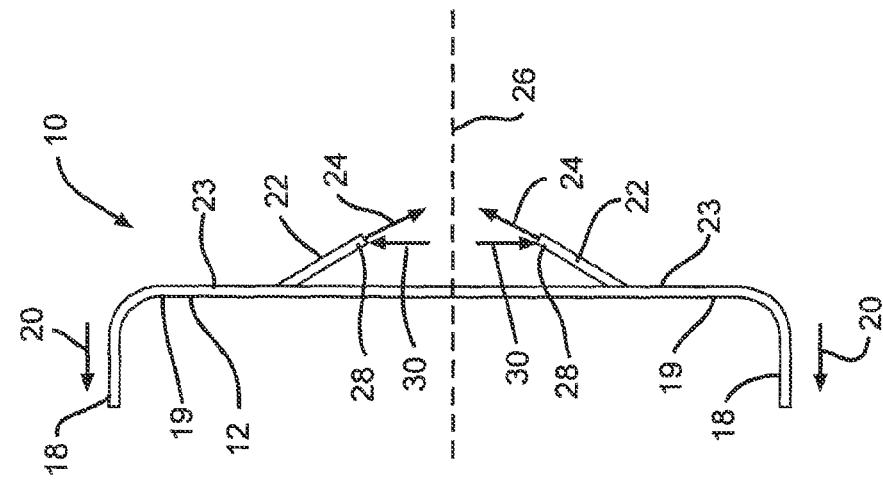
FIG. 2 shows a side view of the retention clip of FIG. 1.
Figure 1:
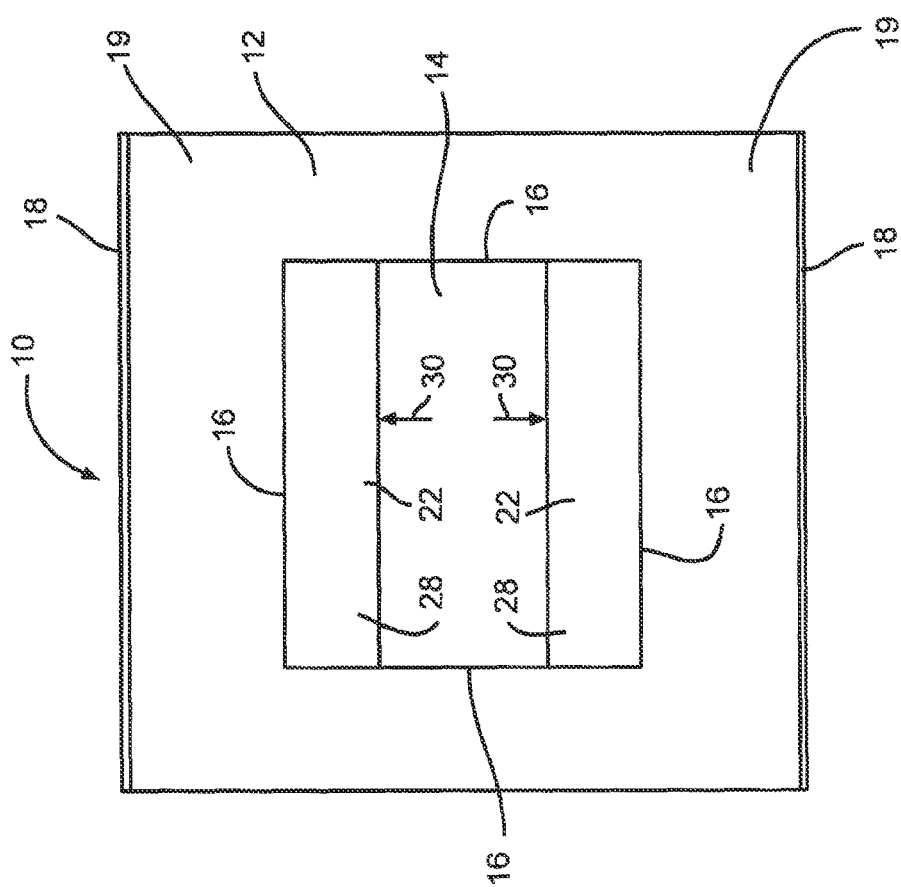
FIG. 1 shows a top view of one embodiment of a retention clip under the disclosure.

FIGS. 1 and 2 show top and side views of one embodiment of a retention clip 10 under the disclosure. The retention clip 10 may be made of metal and/or other type of material which may be compatible with the environment. The retention clip 10 may comprise a support surface 12 having an aperture 14 extending through the support surface 12. The aperture 14 may be substantially rectangular. The support surface 12 may surround an entire perimeter 16 of the aperture 14 to form a closed aperture. In other embodiments, the aperture 14 may be of varying shapes, sizes, orientations, directions, and/or configurations. The retention clip 10 may further comprise two anti-rotation surfaces 18 extending from one side 19 of the support surface 12 in non-parallel directions 20. The anti-rotation surfaces 18 may be substantially perpendicular to the support surface 12. In other embodiments, there may be one or more anti-rotation surfaces 18 of varying orientations, configurations, directions, sizes, and/or shapes.

The retention clip 10 may additionally comprise a plurality of angled tabs 22 extending from an opposed side 23 of the support surface 12 in non-parallel directions 24 towards a center 26 of the aperture 14. At least a portion 28 of each angled tab 22 may be disposed directly below the aperture 14. The tabs 22 may be elastic below a preset load 30 placed on the tabs 22, and the tabs 22 may deform and lose their elasticity above the preset load 30. The tabs 22 may be designed to accommodate a certain preset load 30 placed on the tabs 22 (such as from the threads of a fastener passing over the tabs), and to fail/deform above the preset load 30. In other embodiments, the retention clip 10 may comprise any number of tabs 22 in varying shapes, sizes, orientations, directions, and/or configurations. For instance, in one embodiment, the tabs 22 may extend from side 19 of the support surface 12.

FIG. 3 is a side view of one embodiment of hardware 132 to which the clip 10 may be applied. The hardware 132 may comprise a device 134 which may comprise a plurality of apertures 136 extending through open, opposing end portions 138 of the device 134. The device 134 may comprise a clamp, a P-clamp, a block clamp, a U-clamp, an aircraft clamp, and/or another type of device for securing aircraft or non-aircraft parts. The device 134 may extend over a tube 137. The tube 137 may comprise an electrical tube, a hydraulic tube, a pneumatic tube, an aircraft tube, a non-aircraft tube, and/or another type of tube. In still other embodiments, the device 134 may extend over a non-tube aircraft part, and/or non-aircraft part. A threaded fastener 139 having a threaded end 140 with threads 141 and a head end 142 may be disposed in alignment over the apertures 136 of the device 134. The fastener 139 may be an aircraft part and/or a non-aircraft part. The end portions 138 of the device 134 may be disposed over side 19 of the support surface 12 of the clip 10 in between the anti-rotation surfaces 18. The opposed side 23 of the support surface 12 of the clip 10 may be disposed against an assembly tool base 144 having an aperture 146 extending through the tool base 144.

FIG. 4 is a flowchart of one embodiment under the disclosure of a method 248 of closing a device 134 using a clip 10. In step 250, an open device 134 may be provided having a plurality of apertures 136 on opposing open portions 138 of the device 134. FIG. 3 shows one embodiment of step 250 with an open device 134 being provided having a plurality of apertures 136 on opposing open portions 138 of the device 134. The provided device 134 may comprise any of the embodiments disclosed within this disclosure. In step 252, a retention clip 10 may be provided. FIG. 3 also shows one embodiment of step 252 with a retention clip 10 being provided. The provided clip 10 may comprise any of the embodiments disclosed within this disclosure.

In step 254, the fastener 139 may be inserted through the apertures 136 of the device 134. FIG. 5 shows a side view of one embodiment of step 254 being implemented to insert the fastener 139 of FIG. 3 through the apertures 136 of the device 134 of FIG. 3.

In step 256, the fastener 139 may be inserted through the aperture 14 of the retention clip 10. FIG. 6 shows a side view of one embodiment of step 256 being implemented to insert the fastener 139 of FIG. 5 through the aperture 14 of the retention clip 10. The fastener 139 may also be extended through the aperture 146 of the tool base 144, so that the fastener 139 extends through the apertures 136 of the device 134, the aperture 14 of the clip 10, and the aperture 146 of the tool base 144. In other embodiments, a tool base 144 may not be used.

In step 258, the opposed, open portions 138 of the device 134 may be closed against one another by moving the fastener 139 along the device apertures 136 and along the retention clip aperture 14 during which the threads 141 of the fastener 139 may move axially against the tabs 22. FIG. 7 shows a side view of one embodiment of step 258 being implemented to close the opposed, open portions 138 of the device 134 of FIG. 6 by moving the fastener 139 axially 148 along the device apertures 136 and along the retention clip aperture 14. During this axial movement 148 of the fastener 139, the tabs 22 of the clip 10 may elastically snap substantially radially back and forth 150 while the tabs 22 are below the preset load 30. The tabs 22 may move from the position 152 of FIG. 7A, showing the cross-section view through line 7-7 of FIG. 7, between and over the axially moving threads 141, without the tabs 22 deforming, to the position 154 shown in the cross-section view of FIG. 7B.

In step 260, when the fastener 139 is stopped from moving along the device apertures 136 and along the retention clip aperture 14, the elastic tabs 22 of the clip 10 may be secured fixedly against the threads 141 of the fastener 139 with the elastic tabs 22 below the preset load 30 in order to keep the opposed, portions 138 of the device 134 closed. FIG. 7 also shows the elastic tabs 22 of the clip 10 being fixedly secured against the threads 141 of the fastener 139 of FIG. 6. In this position, the head 142 of the fastener 139 may be disposed against one of the opposing, end portions 138 of the device 134 and the other of the opposing, end portions 138 of the device 134 may be disposed against side 19 of support surface 12 of the clip 10. In such manner, the support surface 12 may support the device 134.

Figure 8:
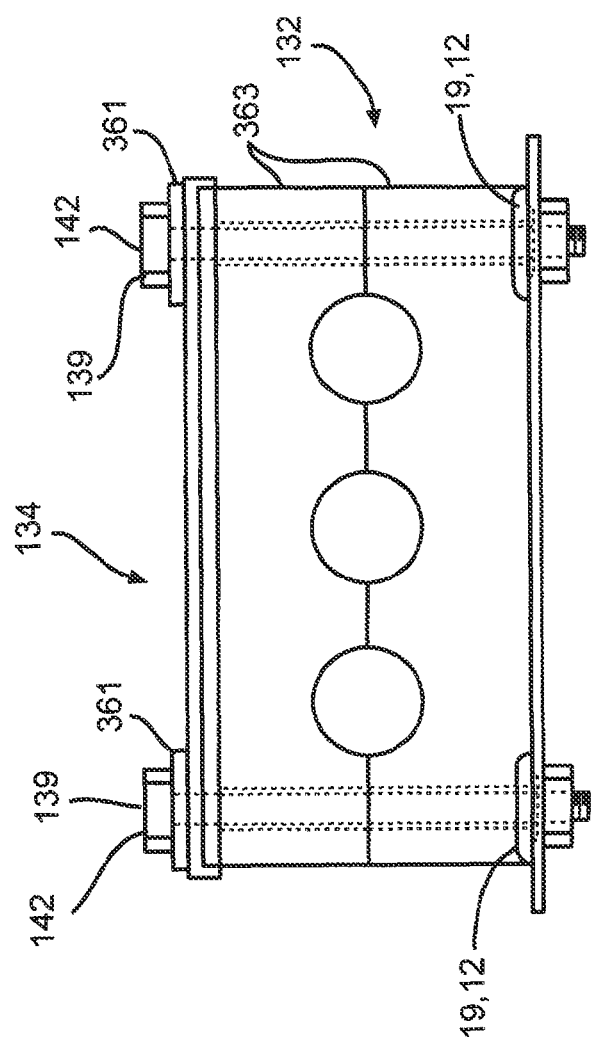
FIG. 8 shows a side view of various types of hardware (such as a block clamp) being located between a support surface of a clip and a head of the fastener.

The opposing end portions 138 of the device 134 may both be disposed between the anti-rotation surfaces 18 of the clip 10 thereby preventing the clip 10 from rotating relative to the device 134 and/or other types of hardware 132 supported on and/or by the support surface 12. In this position, the device 134 may be closed against the tube 137 to prevent movement of the tube 137 relative to the device 134. In other embodiments, the device 134 may be closed against varying types of non-tube apparatus. In still another embodiment, as shown in the side view of FIG. 8, a block-device 134, a washer 361, and spacers 363 may be located between the side 19 of support surface 12 and the head 142 of the fastener 139. In other embodiments the support surface 12 may support various types of hardware 132 which may include various types of devices such as a clamp, a U-clamp, a P-clamp, an aircraft clamp, a spacer 363, a washer 361, a tube 137, an aircraft part, and/or other types of hardware. In still other embodiments, varying types of apparatus may be disposed between the support surface 12 and the head 142 of the fastener 139.

In step 262, the closed device 134 holding the tube, aircraft part, and/or non-aircraft part may be transported to an installation location with the elastic tabs 22 of the clip 10 fixedly secured against the threads 141 of the fastener 139 with the tabs 22 below the preset load 30 in order to keep the portions 138 of the device 134 closed during transport. FIG. 9 shows a side view of one embodiment of step 262 being implemented to transport the closed device 134 of FIG. 7 to an installation location 465 of an aircraft and/or non-aircraft part 465A.

In step 264, an end 140 of the fastener 139 may be located in alignment with a nut at the installation location 465. FIG. 10 shows a side view of one embodiment of step 264 being implemented to locate the end 140 of the fastener 139 of FIG. 9 in alignment with a nut 567 at the installation location 465 of the aircraft and/or non-aircraft part 465A.

Figure 12:
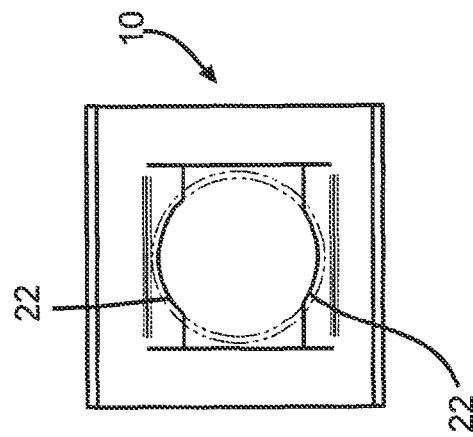
FIG. 12 shows a bottom view of the clip 10 of FIG. 11 with the fastener removed from the clip aperture to show what the deformed tabs may look like after the fastener is screwed into the nut.

In step 266, at the installation location 465 of the aircraft and/or non-aircraft part 465A, the fastener 139 holding the tube, aircraft part, and/or non-aircraft part may be screwed into the nut 567 with enough torque to cause the preset load 30 on the tabs 22 to be exceeded. This may cause the tabs 22 to deform, to lose their elasticity, and to no longer secure the clip 10 in place relative to the fastener 139 due to their deformation. FIG. 11 shows a perspective view of one embodiment of step 266 being implemented to screw the fastener 139 of FIG. 10 into the nut 567 at the installation location 465 with enough torque 669 to cause the preset load 30 on the tabs 22 to be exceeded. This may cause the tabs 22 to lose their elasticity and to deform away from the threads 141 of the fastener 139. As a result, the tabs 22 may no longer secure the clip 10 in place relative to the fastener 139 due to their deformation thereby releasing the clip 10 from the device 134 and its attached tube 137. FIG. 12 shows a bottom view of one embodiment of the clip 10 of FIG. 11 with the fastener 139 removed from the aperture 14 to show what the deformed tabs 22 may look like after the fastener 139 was screwed into the nut 567 with enough torque to cause the preset load 30 on the tabs 22 to be exceeded thereby deforming the tabs 22.

In step 268, at the installation location 465, the fastener 139 may be unscrewed from the nut 567 and the fastener 139 may be removed from the device apertures 136 and the retention clip aperture 14 without interference from the deformed tabs 22. FIG. 13 shows a perspective view of one embodiment of step 268 being implemented to unscrew the fastener 139 of FIG. 11 from the nut 567 at the installation location 465 in order to remove the fastener 139 from the device apertures 136 and the retention clip aperture 14 without interference from the deformed tabs 22. In other embodiments, the size, orientation, configuration, direction, angle, and/or type of the tabs 22 of the clip 10 may be varied in order to attach, transport, install, and/or release the clip 10 to and/or from varying types and sizes of fasteners 138, devices 134, tubes 136, hardware 132, aircraft and/or non-aircraft parts 465A, and/or other types of parts.

One or more embodiments of the disclosure may reduce and/or eliminate one or more problems of one or more of the prior art apparatus and/or methods by providing a retention clip and/or method of install which may be adapted to: captivate device hardware, including bolts, washers, spacers, close/secure parts, tubing, and/or other types of parts, during transport and install thereby minimizing the relative movement of tubes and/or subassembly components; self-align fasteners of the device; avoid rotation relative to the device; efficiently close the device and stay in place during transport with little necessary labor and/or cost; yield upon install without impacting the fit, form, or function of the system; be easily removed; accommodate varying sized and configuration devices; be constructed of a material that is compatible with the environment; and/or provide one or more other types of benefits.

It should be understood, of course, that the foregoing relates to exemplary embodiments of the disclosure and that modifications may be made without departing from the spirit and scope of the disclosure as set forth in the following claims.

We claim:

1. A method comprising:
   providing hardware having apertures on opposing end portions of the hardware;
   providing a retention clip comprising a support surface having an aperture extending through the support surface, two anti-rotation surfaces extending non-parallel from each side of the support surface, and at least one angled tab extending non-parallel from an opposite side of the support surface towards a center of the aperture of the retention clip;
   disposing the opposing end portions of the hardware between the two anti-rotation surfaces of the retention clip;
   extending a fastener through the apertures of the hardware and through the aperture of the retention clip into a nut securing the hardware to the retention clip with the at least one angled tab disposed against the fastener;
   transporting the hardware to an installation location with the elastic tabs of the secured clip fixedly against the threads of the fastener with the tabs below a preset load in order to keep the opposing end portions of the hardware closed during transport;
   and
   removing the fastener from the nut and the apertures of the hardware and the aperture of the retention clip to allow the hardware to move out of and into the retention clip.

2. The method of claim 1, wherein the two anti-rotation surfaces are disposed perpendicular to the support surface.

3. The method of claim 1, wherein the two anti-rotation surfaces extend perpendicularly from a bottom portion of the support surface.

4. The method of claim 3, wherein the two anti-rotation surfaces form a U-shape in combination with the support surface.

5. The method of claim 1, wherein the two anti-rotation surfaces comprise identical lengths as sides of a bottom portion of the support surface from which the two anti-rotation surfaces extend.

6. The method of claim 1, wherein the hardware comprises a clamp.

7. The method of claim 1, wherein an imaginary plane extends parallel to both anti-rotation surfaces half-way in-between both anti-rotation surfaces, and two angled tabs each extend entirely from separate respective portions of the support surface which are disposed on opposite sides of the imaginary plane.

8. The method of claim 1, further comprising attaching the fastener to a tool base.

9. The method of claim 8, further comprising attaching the fastener to a spacer.

10. The method of claim 1, wherein two angled tabs extend non-parallel from the top portion of the support surface towards the center of the aperture of the retention clip.

11. The method of claim 1, further comprising the step of, at the installation location, screwing the fastener into the nut with enough torque to cause the preset load on the tabs to be exceeded, the tabs to deform, the tabs to lose their elasticity, and the tabs to no longer secure the retention clip in place relative to the fastener.

12. A method comprising:
   providing hardware having apertures on opposing end portions of the hardware;
   providing a retention clip comprising a support surface having an aperture extending through the support surface, two anti-rotation surfaces extending non-parallel from each side of the support surface, and at least one angled tab extending non-parallel from an opposite side of the support surface into the aperture, wherein a portion of the at least one angled tab is disposed directly below the aperture, and at least one angled tab is elastic below a preset load placed on the at least one angled tab;

disposing the opposing end portions of the hardware between the two anti-rotation surfaces of the retention clip;

extending a fastener through the apertures of the hardware and through the aperture of the retention clip into a nut securing the hardware to the retention clip with the at least one angled tab disposed against the fastener;

closing the opposing end portions of the hardware against one another by moving the fastener along the apertures of the hardware and along the aperture of the retention clip during which threads of the fastener move axially against the at least one angled tab causing the at least one angled tab to elastically snap back and forth, while the at least one angled tab is below the preset load, between and over the axially moving threads;

securing the at least one angled tab of the clip fixedly against the threads of the fastener with the at least one angled tab below the preset load in order to keep the end portions of the hardware closed; and transporting the closed hardware to an installation location with the elastic tabs of the secured clip fixedly against the threads of the fastener with the tabs below the preset load in order to keep the portions of the hardware closed during transport.

13. The method of claim 12, further comprising:
removing the fastener from the nut and the aperture to allow the hardware to move out of and into the retention clip.

14. The method of claim 12, wherein the support surface surrounds an entire perimeter of the aperture.

15. The method of claim 12, wherein at least one of the closing and the securing steps further comprises at least one of a washer and a spacer being secured between the support surface and the head of the fastener.

16. The method of claim 12, further comprising the step of closing the hardware against a tube.

17. The method of claim 12, further comprising the step of, at the installation location, screwing the fastener into the nut with enough torque to cause the preset load on the tabs to be exceeded, the tabs to deform, the tabs to lose their elasticity, and the tabs to no longer secure the retention clip in place relative to the fastener.

18. The method of claim 17, further comprising, at the installation location, unscrewing the fastener from the nut and removing the fastener from the apertures of the hardware and the aperture of the retention clip without interference from the deformed tabs.

19. The method of claim 12, wherein the method is used to transport and install aircraft parts.

20. The method of claim 12, wherein at least one angled tab extends towards a center of the aperture of the retention clip.

* * * * *